(12) United States Patent
Sato et al.

(10) Patent No.: US 8,437,796 B2
(45) Date of Patent: *May 7, 2013

(54) TRANSMISSION LEVEL CONTROL METHOD AND TRANSCEIVER APPARATUS IN WIRELESS LOCAL LOOP SYSTEM

(75) Inventors: Shoichi Sato, Kawasaki (JP); Koji Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,198

(22) Filed: May 25, 2011

(65) Prior Publication Data

US 2011/0281611 A1 Nov. 17, 2011

Related U.S. Application Data

(62) Division of application No. 11/584,898, filed on Oct. 23, 2006, now Pat. No. 7,986,957, which is a division of application No. 10/982,724, filed on Nov. 5, 2004, now Pat. No. 7,146,183, and a division of application No. 09/394,499, filed on Sep. 13, 1999, now Pat. No. 6,829,488.

(30) Foreign Application Priority Data

Sep. 24, 1998 (JP) .................................. 10-269741

(51) Int. Cl.
*H04B 7/00* (2006.01)

(52) U.S. Cl.
USPC .................. 455/522; 455/69; 455/70; 455/88

(58) Field of Classification Search .................. 455/522, 455/69, 88, 70; 370/318
See application file for complete search history.

(56) References Cited

U.S. PATENT DOCUMENTS

| 4,613,990 A * | 9/1986 | Halpern ........................ 455/522 |
| 5,732,328 A | 3/1998 | Mitra et al. |
| 5,835,846 A | 11/1998 | Furukawa et al. |
| 5,898,682 A | 4/1999 | Kanai |
| 5,924,043 A | 7/1999 | Takano |

(Continued)

FOREIGN PATENT DOCUMENTS

| GB | 2316789 | 3/1998 |
| JP | 335625 | 2/1991 |

(Continued)

OTHER PUBLICATIONS

Japanese Notice of Reasons for Rejection dated Jan. 5, 2010, from the corresponding Japanese Application No. 2005-031063, with translation.

(Continued)

*Primary Examiner* — David Q Nguyen
(74) *Attorney, Agent, or Firm* — Katten Muchin Rosenman LLP

(57) ABSTRACT

A transmission level control method in a wireless local loop system capable of suppressing occurrence of an unnecessarily high transmission level, comprises a step of generating a required reception level corresponding to a classification of data, a step of detecting the reception level of data at a receiver side transceiver apparatus, a step of finding a level difference between the detected reception level and the required reception level corresponding to the classification of the related received data, and a step of controlling a change of the transmission level at a transmitter side transceiver apparatus according to this level difference.

1 Claim, 14 Drawing Sheets

U.S. PATENT DOCUMENTS

| | | | |
|---|---|---|---|
| 5,933,782 | A | 8/1999 | Nakano et al. |
| 5,943,610 | A | 8/1999 | Endo |
| 5,991,618 | A | 11/1999 | Hall |
| 6,002,919 | A | 12/1999 | Posti |
| 6,031,828 | A | 2/2000 | Koro et al. |
| 6,035,210 | A | 3/2000 | Endo et al. |
| 6,075,974 | A | 6/2000 | Saints et al. |
| 6,137,840 | A | 10/2000 | Tiedemann, Jr. et al. |
| 6,173,188 | B1 | 1/2001 | Kim |
| 6,275,478 | B1 * | 8/2001 | Tiedemann, Jr. ............. 370/318 |
| 6,275,506 | B1 | 8/2001 | Fazel et al. |
| 6,335,923 | B2 | 1/2002 | Kubo et al. |
| 6,396,867 | B1 * | 5/2002 | Tiedemann et al. .......... 375/141 |
| 6,539,050 | B1 | 3/2003 | Lee et al. |
| 6,539,226 | B1 | 3/2003 | Furukawa et al. |
| 6,643,272 | B1 | 11/2003 | Moon et al. |
| 7,986,957 | B2 | 7/2011 | Sato et al. |
| 2001/0010686 | A1 | 8/2001 | Kubo et al. |
| 2002/0068534 | A1 | 6/2002 | Ue et al. |

FOREIGN PATENT DOCUMENTS

| | | |
|---|---|---|
| JP | 08172654 | 7/1996 |
| JP | 8237194 | 9/1996 |
| JP | 08251229 | 9/1996 |
| JP | 9307499 | 11/1997 |
| JP | 9331291 | 12/1997 |
| JP | 1075470 | 3/1998 |
| WO | 9827675 | 6/1998 |

OTHER PUBLICATIONS

US Office Action dated Apr. 19, 2007 from the corresponding U.S. Appl. No. 11/584,898.
Japanese Decision of Final Rejection dated Mar. 7, 2006 from corresponding Japanese Application No. 10-269741, with translation.
Japanese Office Action dated Dec. 7, 2004 from the corresponding Japanese Application No. 10-269741, with translation.
US Office Action dated Nov. 14, 2007 from the corresponding U.S. Appl. No. 11/584,898.
US Office Action dated Jul. 13, 2007 from the corresponding U.S. Appl. No. 11/584,898.
US Office Action dated Jun. 16, 2008 from the corresponding U.S. Appl. No. 11/584,898.
US Office Action dated Jan. 2, 2009 from the corresponding U.S. Appl. No. 11/584,898.
Japanese Notice of Reasons for Rejection dated Sep. 15, 2009, from the corresponding Japanese Application No. 2005-031063, with translation.
US Office Action dated Nov. 2, 2009 from the corresponding U.S. Appl. No. 11/584,898.
US Office Action dated Apr. 15, 2010 from the corresponding U.S. Appl. No. 11/584,898.
US Office Action dated Oct. 8, 2010 from the corresponding U.S. Appl. No. 11/584,898.
US Notice of Allowance dated Mar. 18, 2011 from the corresponding U.S. Appl. No. 11/584,898.
US Communication dated Mar. 24, 2011 from the corresponding U.S. Appl. No. 11/584,898.
US Communication dated Apr. 4, 2011 from the corresponding U.S. Appl. No. 11/584,898.
US Response to Amendment under Rule 312 dated May 12, 2011 from the corresponding U.S. Appl. No. 11/584,898.
US file history of U.S. Appl. No. 11/584,898 as of Jul. 6, 2011.
US Office Action dated May 12, 2005 from the corresponding U.S. Appl. No. 10/982,724.
US Office Action dated Jan. 23, 2006 from the corresponding U.S. Appl. No. 10/982,724.
US Notice of Allowance dated Aug. 9, 2006 from the corresponding U.S. Appl. No. 10/982,724.
US file history of U.S. Appl. No. 10/982,724 as of Jul. 6, 2011.
US file history of U.S. Appl. No. 10/855,055 as of Jul. 6, 2011.
US Notice of Allowance dated Nov. 1, 2006 from the corresponding U.S. Appl. No. 10/855,055.
US file history of U.S. Appl. No. 09/394,499 as of Jul. 6, 2011.
Chinese Office Action dated May 14, 2004 from the corresponding Chinese Patent Application No. 991203887.
US Notice of Allowance dated Sep. 7, 2004 from the corresponding U.S. Appl. No. 09/394,499.
US Notice of Allowance dated May 27, 2004 from the corresponding U.S. Appl. No. 09/394,499.
US Office Action dated Apr. 22, 2004 from the corresponding U.S. Appl. No. 09/394,499.
US Office Action dated Jan. 2, 2004 from the corresponding U.S. Appl. No. 09/394,499.
US Office Action dated May 16, 2003 from the corresponding U.S. Appl. No. 09/394,499.
US Office Action dated Jan. 2, 2003 from the corresponding U.S. Appl. No. 09/394,499.
US Office Action dated Jun. 20, 2002 from the corresponding U.S. Appl. No. 09/394,499.
United States Office Action dated Oct. 19, 2011, from corresponding U.S. Appl. No. 13/115,223.
United States Office Action dated Apr. 5, 2012, from corresponding U.S. Appl. No. 13/115,223.

* cited by examiner

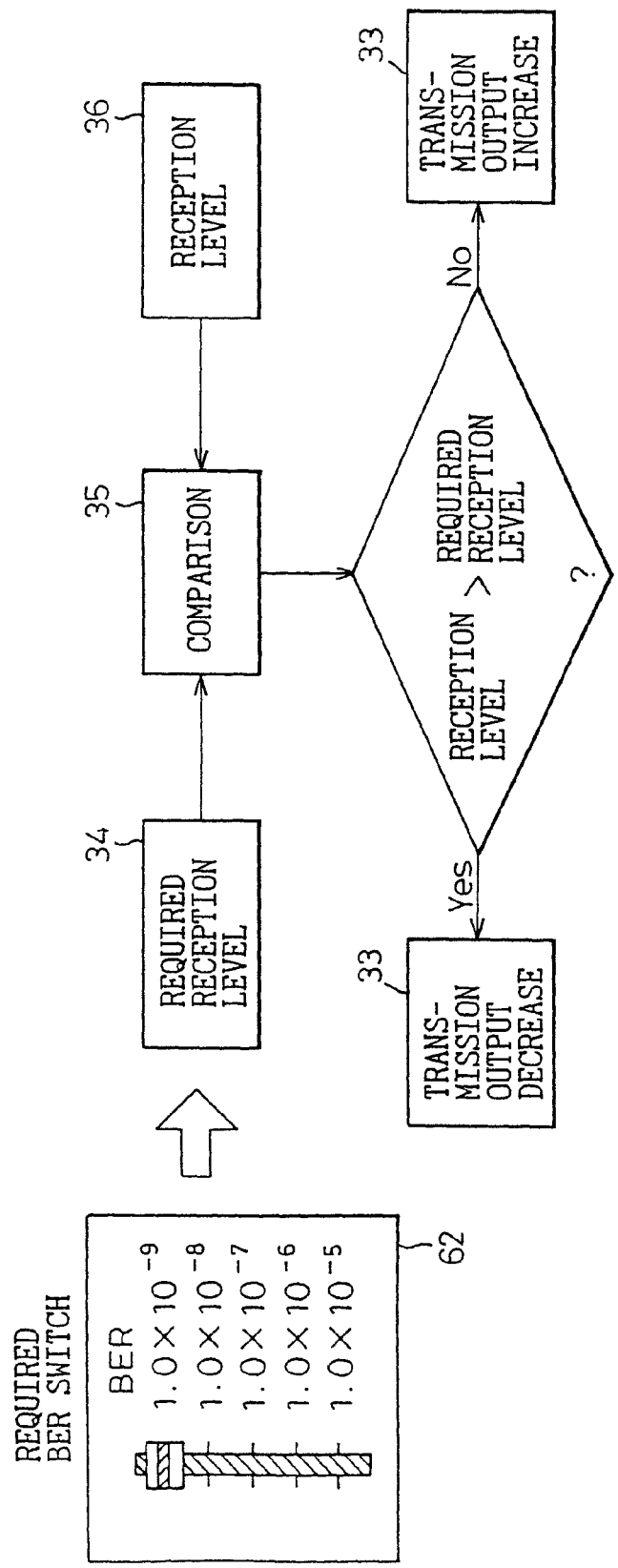

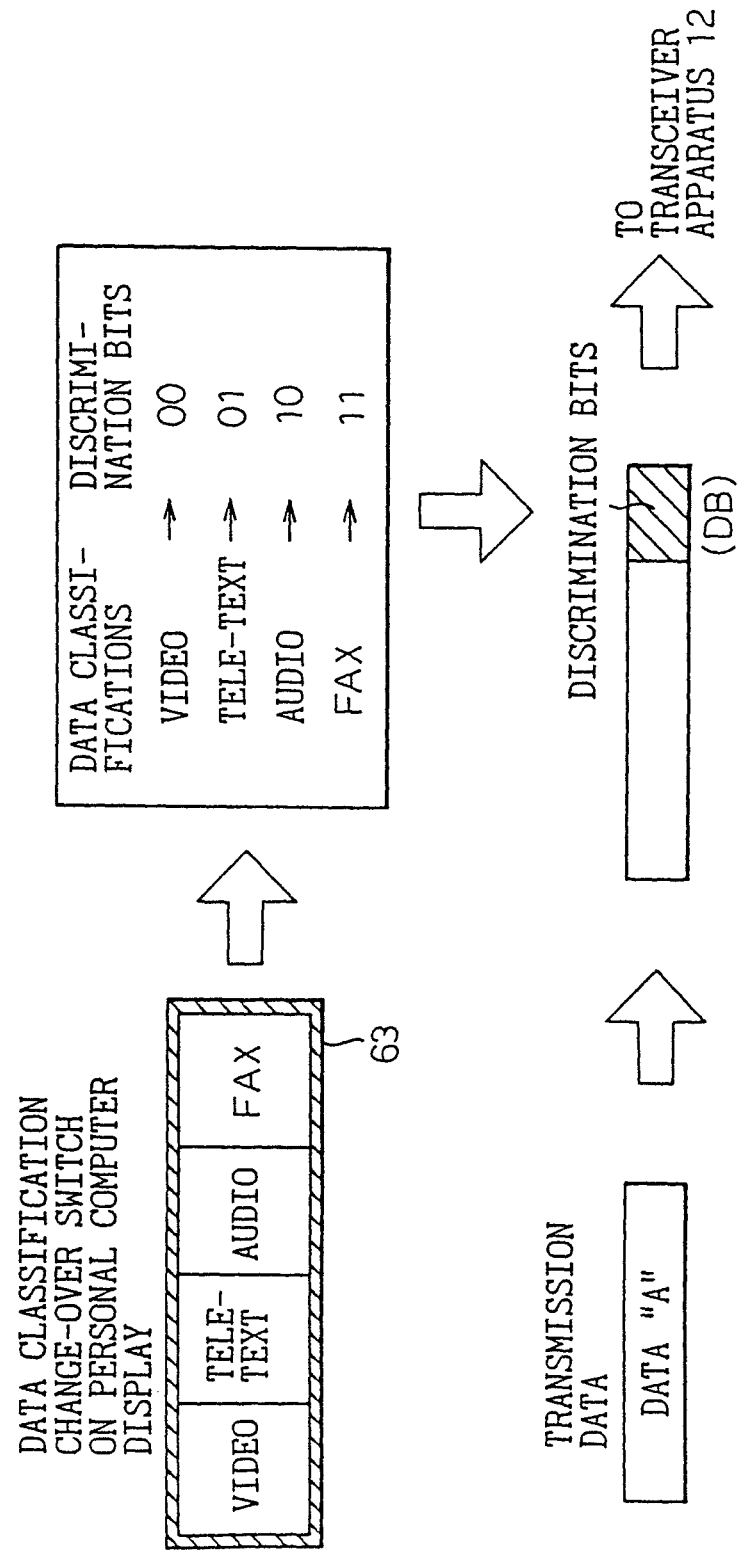

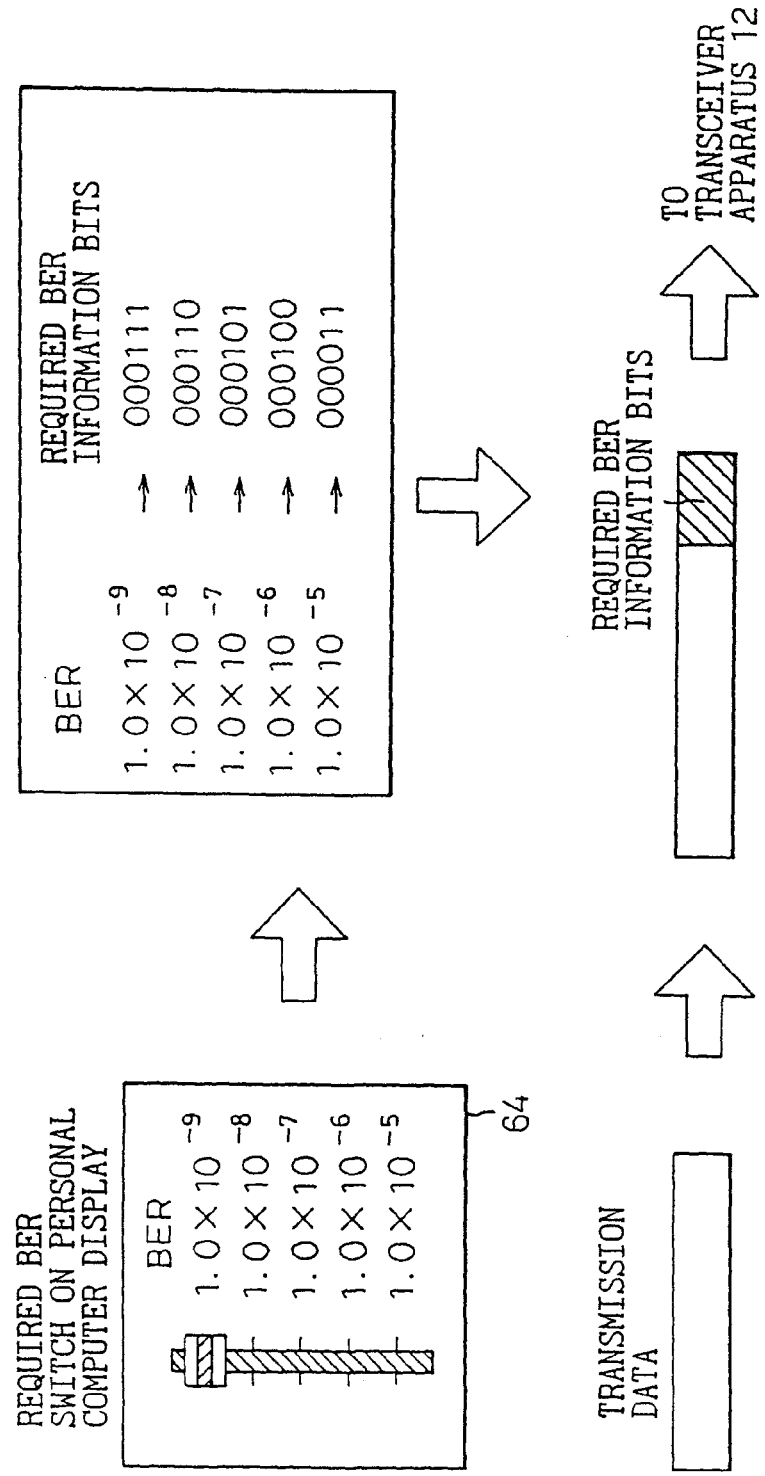

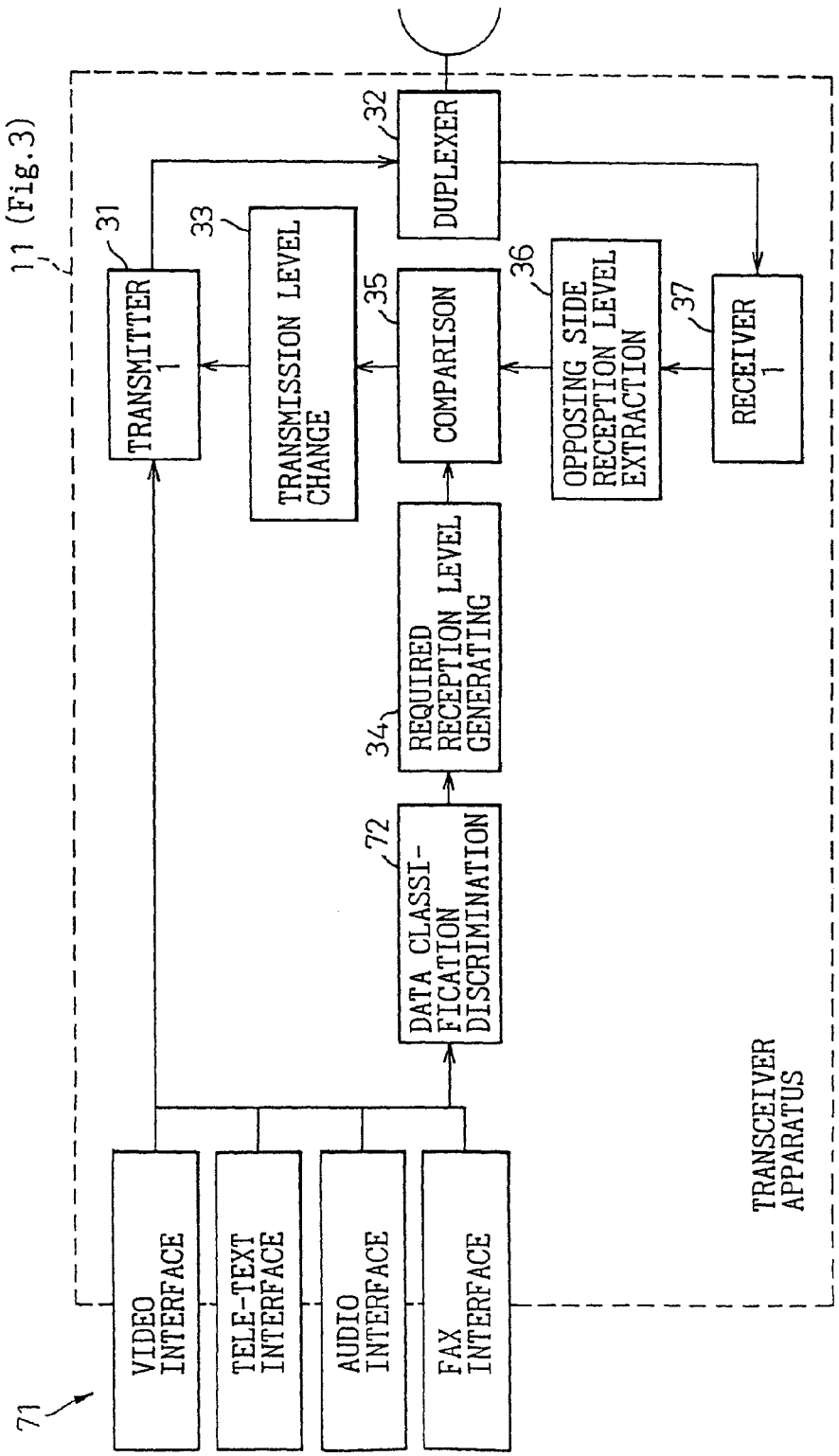

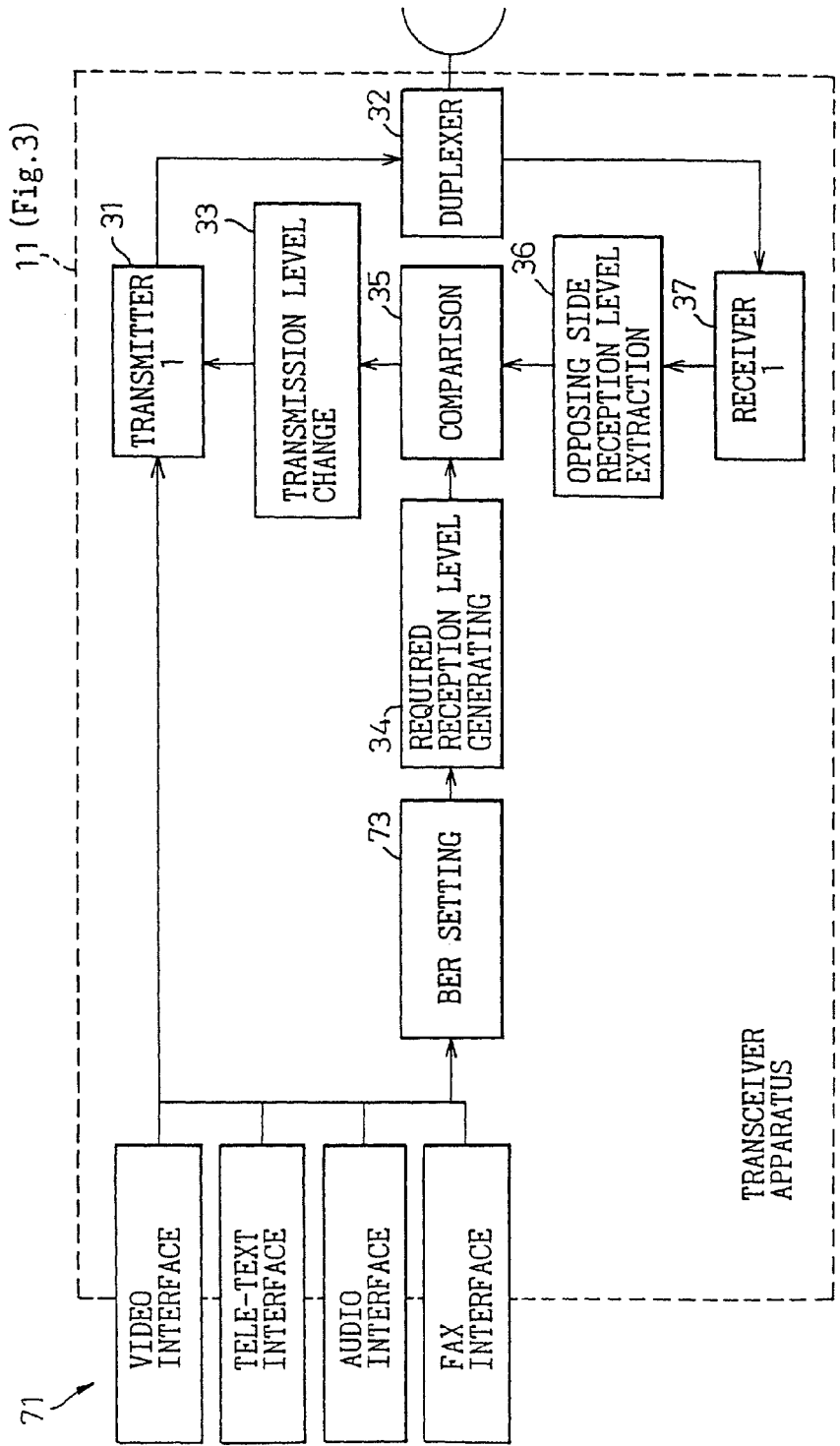

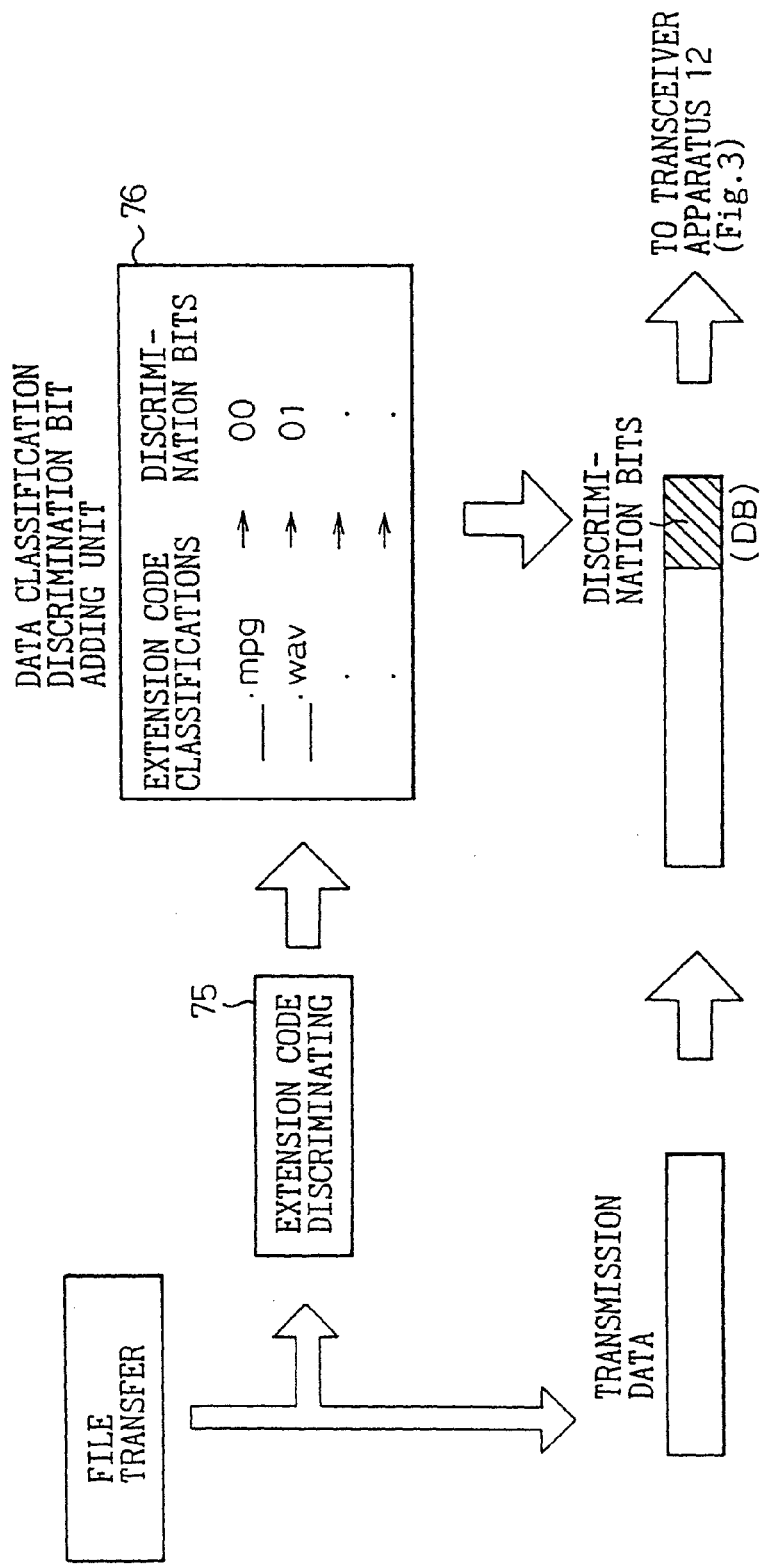

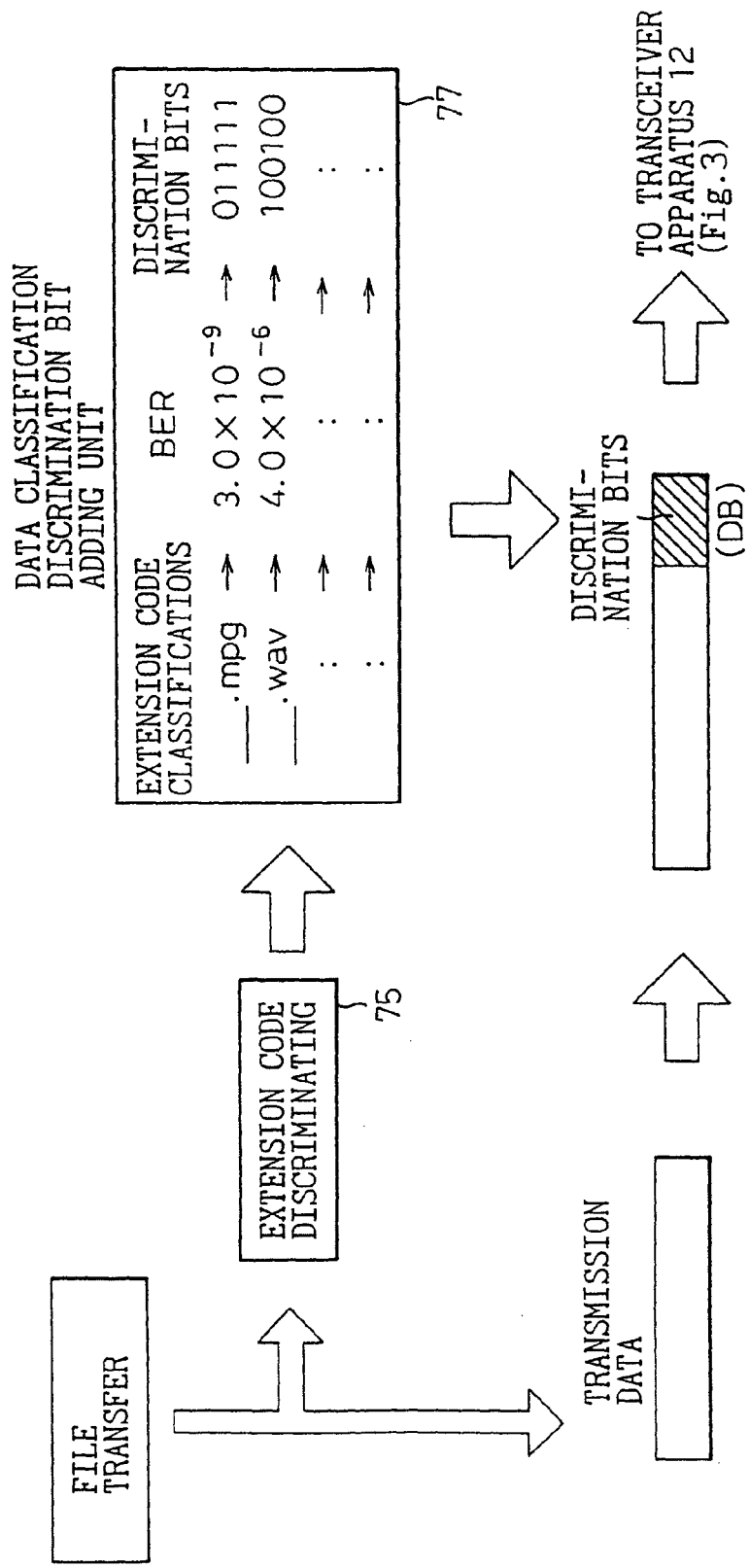

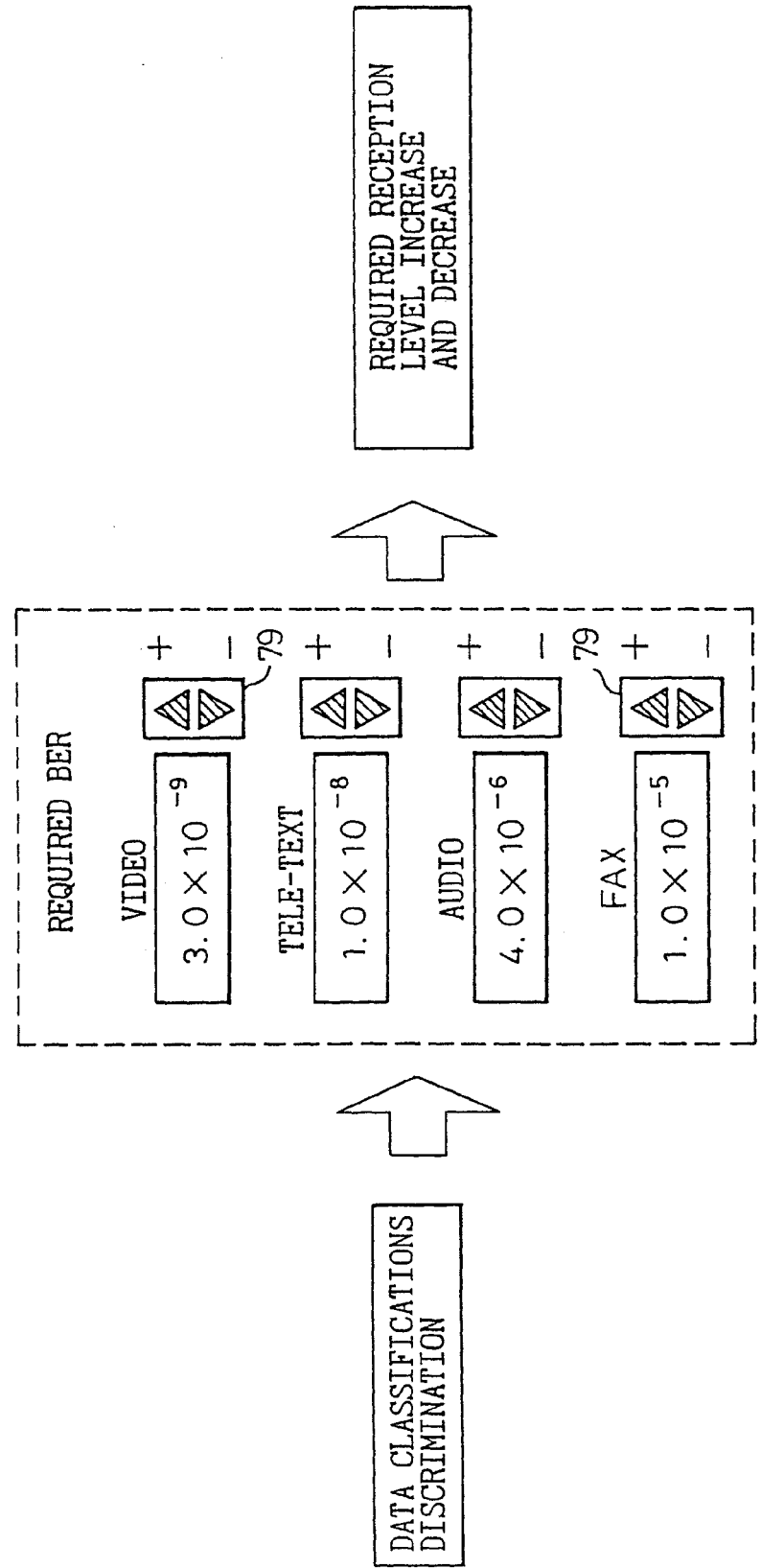

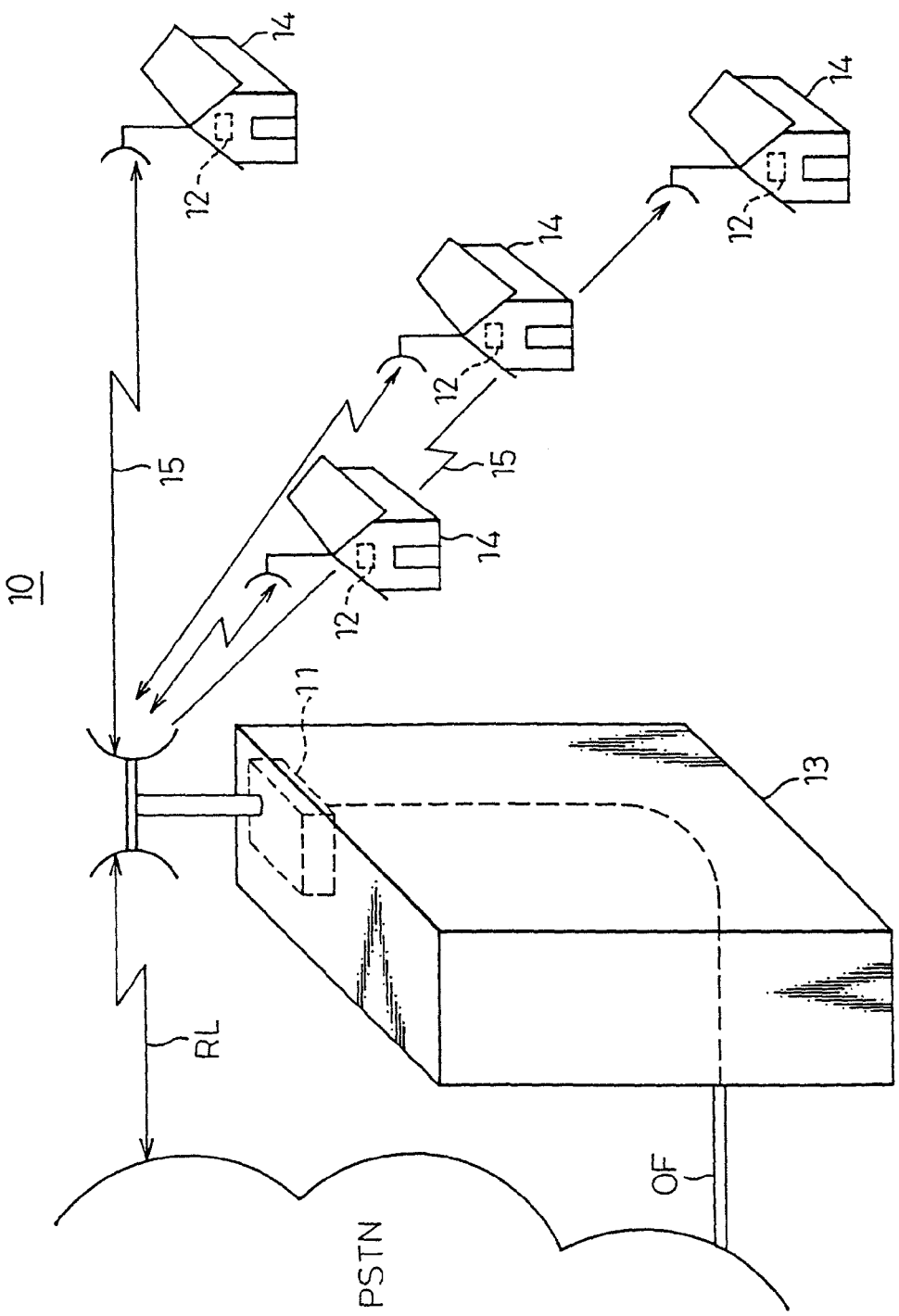

TRANSMISSION LEVEL CONTROL METHOD AND TRANSCEIVER APPARATUS IN WIRELESS LOCAL LOOP SYSTEM

BACKGROUND OF THE INVENTION

1. Field of the Invention

The present invention relates to a transceiver apparatus in a wireless local loop system, more particularly relates to transmission level control in the transceiver apparatus.

In recent years, due to the rapid advances being made in data communications technology and the accompanying improvement and reduction of price of the data communications apparatuses such as personal computers etc., there has been a rapid spread of use of multimedia applications through the Internet. In the future, there are expected to be a variety of applications using the Internet etc. such as remote education and medical treatment and increasing electronic commercial transactions. Under these circumstances, an increase of the speed of networks, an enlargement of their capacity, and a reduction of their costs are being urgently sought worldwide. In Japan, the government has proposed establishment of a nation-wide optical fiber network reaching into every home (FTTH: Fiber To The Home) aimed at completion by the year 2010. However, the year 2010 is still far in the future. On the other hand, some claim that it would be difficult to lay optical fibers to all homes even by the year 2010 and that the most that could be accomplished would be laying optical fibers reaching individual communities (FTTC: Fiber To The Curb).

In view of the above, interest is now focusing on establishment of wireless local loop systems for providing high speed, large capacity service to individual homes by wireless channels. The Japanese Ministry of Posts and Telecommunications and other leading agencies have set up a study group and have set targets for commercialization. The present invention relates to such a wireless local loop system. In particular, it relates to a system for controlling the transmission level in a digital radio transceiver apparatus in a wireless local loop system for time division multiplex transmission of various types, of data. It describes a method for transmission level control on a same channel taking into consideration a reception level at an opposing side and a required reception level differing for every classification of data to be transmitted.

2. Description of the Related Art

As will be explained in detail later by using the drawings, a wireless local loop system performs the transmission and reception of information via a radio transmission path between a first transceiver apparatus and a second transceiver apparatus.

When desiring to transmit a variety of data having different required carrier-to-noise (C/N) ratios and bit error rates (BER) for each subscriber as in a wireless local loop system, the lines are designed to match with the strictest required C/N on the same channel and the transmission level of the related channel is determined accordingly in multiplex channels of trunk line networks and repeater networks, and in ATM communications. Accordingly, when transmitting data not having a strict required C/N condition, there is the problem that the transmission will be carried out with an excessive output.

SUMMARY OF THE INVENTION

In consideration with the above problem, an object of the present invention is to provide a transmission level control method and a transceiver apparatus in a wireless local loop system enabling transmission level control on a same channel by referring to the reception level and BER and further taking into account the classification of the transmission data—without distinguishing whether the data is continuous or discontinuous—for suppressing the above excessive level of transmission output and, accordingly, lowering the power consumption and reducing the interference to other channels.

To attain the above object, the method of the present invention is a transmission level control method capable of suppressing the occurrence of an unnecessarily high transmission level in a wireless local loop system. This method comprises a step of generating required reception levels corresponding to respective classifications of data, a step of detecting the reception level of data in a receiver side transceiver apparatus, a step of finding a level difference between the detected reception level and the required reception level corresponding to the classification of the related received data, and a step of controlling a change, i.e., increase and decrease, of the transmission level in a transmitter side transceiver apparatus according to this level difference.

BRIEF DESCRIPTION OF THE DRAWINGS

The above object and features of the present invention will be more apparent from the following description of the preferred embodiments given with reference to the accompanying drawings, wherein:

FIG. 6 is a view of a second example for generating a required reception level;

FIG. 7 is a view of a third example for generating a required reception level;

FIG. 8 is a view of a fourth example for generating a required reception level;

FIG. 9 is a view of a fifth example for generating a required reception level;

FIG. 10 is a vies of a sixth example for generating a required reception level;

FIG. 11 is a view of a seventh example for generating a required reception level;

FIG. 12 is a view of an eighth example for generating a required reception level;

FIG. 13 is a view for explaining adjustment in the case of generating the required reception level; and FIG. 14 is a view diagrammatically illustrating the concept of a wireless local loop system.

DESCRIPTION OF THE PREFERRED EMBODIMENTS

Figure 1:
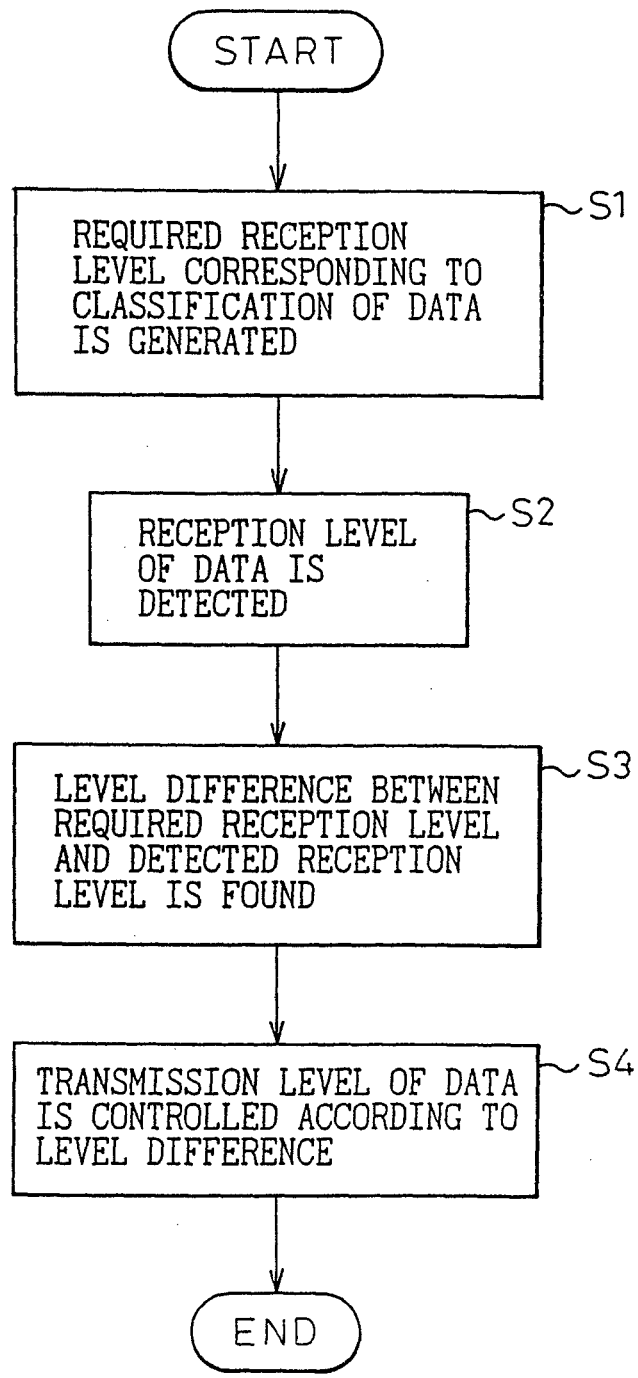
FIG. 1 is a view of the basic steps of a transmission level control method according to the present invention.

Before describing the embodiments of the present invention, the related art and the disadvantages therein will be described with reference to the related figures.

FIG. 14 is a view diagrammatically illustrating the concept of a wireless local loop system.

In the figure, reference numeral 10 indicates a wireless local loop system which performs the transmission and reception of information via a radio transmission path 15 between a first transceiver apparatus 11 and a second transceiver apparatus 12.

The first transceiver apparatus 11 is provided in for example a base transceiver station 13. Further, a second transceiver apparatus 12 is provided in for example each subscriber's home 14. In the following explanation, however, it is also possible to consider the first transceiver apparatus 11 being provided in each subscriber's home 14, and the second transceiver apparatus 12 being provided in the base transceiver station 13.

Note that the base transceiver station 13 is connected to a public switch, telephone network (PSTN) via a radio link (RL) or an optical fiber (OF).

Since it is becoming important to avoid interference with other channels along with the spread of wireless local loop systems and since it is desirable to lower the power consumption, it becomes indispensable to transmit the data with the required lowest limit output capable of securing a channel quality.

Further, due to an attenuation by rain, and multipath fading or the like, also the reception level at the opposing side varies, so the control of the transmission level is important, and a variety of control methods have been proposed also in the past.

However, in the transmission level control method on multiplex channels of the repeater network and trunk line network of the related art, it was a method of realizing the control of the required lowest limit transmission level by monitoring the reception level at opposing side or BER (Bit Error Rate) or the like, or a method of transmitting a plurality of transmission information having different required BER, for example a header part and a data part of a cell by a plurality of channels in the ATM communication, and individually performing the power control, or another method.

Here, in the wireless local loop system, there is an already mentioned problem for the transmission level control. Namely, it is the following problem: Where it is intended to transmit a variety of data having different required C/N (Carrier/Noise) and Bit Error Rate (BER) for each subscriber as in the wireless local loop system, in multiplex channels of trunk line network and repeater network, and in ATM communications, on the same channel, the design of line is carried out so as to match with the strictest required C/N, and the transmission level of the related channel is determined. Accordingly, at the transmission of the data not having a strict required C/N condition, the transmission will be carried out with an excessive output.

The present invention provides a transmission level control method and a transceiver apparatus in a wireless local loop system enabling transmission level control on a same channel by referring to the reception level and BER and further taking into account the classification of the transmission data—without distinguishing whether the data is continuous or discontinuous—for suppressing an excessive level of transmission output and accordingly lowering the power consumption and reducing the interference to other channels.

Since bit error cannot be avoided on a radio transmission path, the lines are designed according to a prescribed standard concerning bit error. The larger the degree of information compression, the larger the effect of the bit error is believed to be. The values of BER generally given as rough standards are shown in the following Table 1 (values of BER corresponding to data classifications).

TABLE 1

| Data classification | BER |
|---|---|
| Video | $3 \times 10^{-9}$ |
| Teletext broadcasting | $1 \times 10^{-8}$ |
| Audio | $4 \times 10^{-6}$ |
| Facsimile | $1 \times 10^{-5}$ |

Here, if the modulation system is the same for all of the data classifications, there is a one-to-one correspondence of the required C/N to the BER of the above Table 1. Due to this, by designing the lines using the required C/N satisfying the BER required for each data classification, it becomes possible to secure a sufficient channel quality for each data classification.

That is, if the modulation system is the same, both the required C/N and the required reception level are determined in a one-to-one correspondence with respect to the BER for each data classification.

Therefore, in the present invention, the reception level at the opposing side is detected, the value of the reception level and the required reception level corresponding to the classification of the data to be transmitted are compared, and the change, i.e., increase and decrease, of the transmission level is controlled in accordance with the level difference between the two levels. Summarizing this, the transmission level is made larger for data with a low required BER (video or other data not allowing error), while the transmission level is made small for data with a high required BER (facsimile or other data allowing error).

FIG. 1 is a view of the basic steps of the method of transmission level control according to the present invention.

The method according to the present invention provides a wireless local loop system for performing the transmission of data between one transceiver apparatus and another transceiver apparatus through a radio transmission path comprising the steps illustrated, that is, Step S1: The required reception level (refer to the above Table 1) corresponding to the classification of data is generated.

Step S2: The reception level of the data in the receiver side transceiver apparatus (11 or 12) is detected.

Step S3: The detected reception level and the required reception level corresponding to the classification of the related received data, are compared, and the level difference between the two reception levels is found.

Step S4: The change of the transmission level in the transmitter side transceiver apparatus (12 or 11) is controlled according to the level difference.

Figure 2:
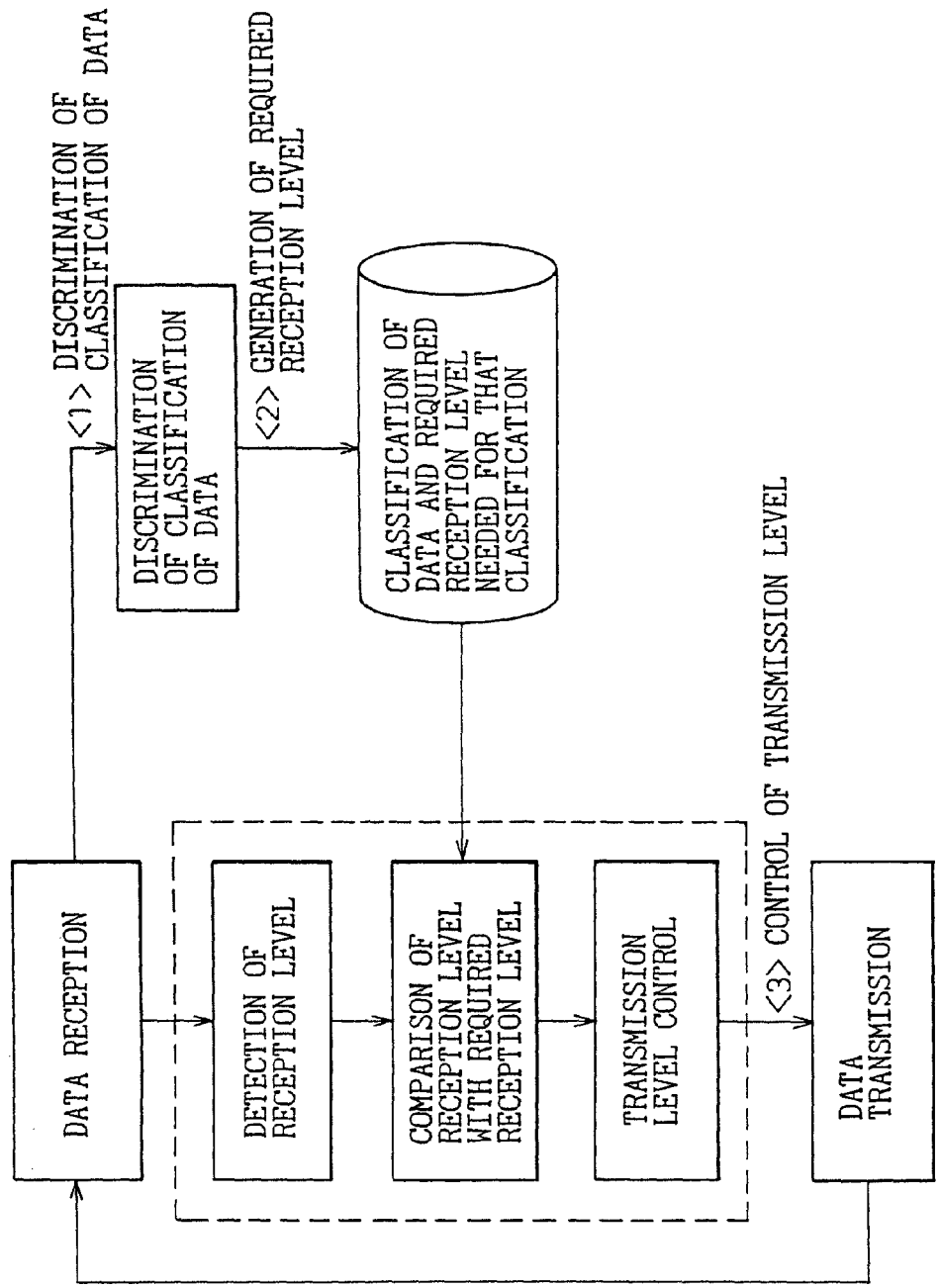
FIG. 2 is a flowchart showing the steps shown in FIG. 1 more concretely.

FIG. 2 is a flow chart showing the steps shown in FIG. 1 more concretely.

Referring to this figure, first, when receiving data, it is discriminated what the classification of the data to be transmitted is (<1< of FIG. 2, discrimination of classification of data).

A reception level enough to secure the channel quality is generated based on the required BER (Table 1) corresponding to the discriminated classification of data (<2> of FIG. 2, generation of the required reception level).

The reception level is detected by measuring the reception level of the data at the receiver side transceiver apparatus. The detected reception level and the required reception level are compared. When the reception level is lower than the required reception level, the amount of insufficiency of the transmission level is increased. Conversely, when the transmission level is excessive, control is performed to maintain the transmission level as it is or decrease the amount of excess etc. (<3> of FIG. 2, control of transmission level).

Figure 3:
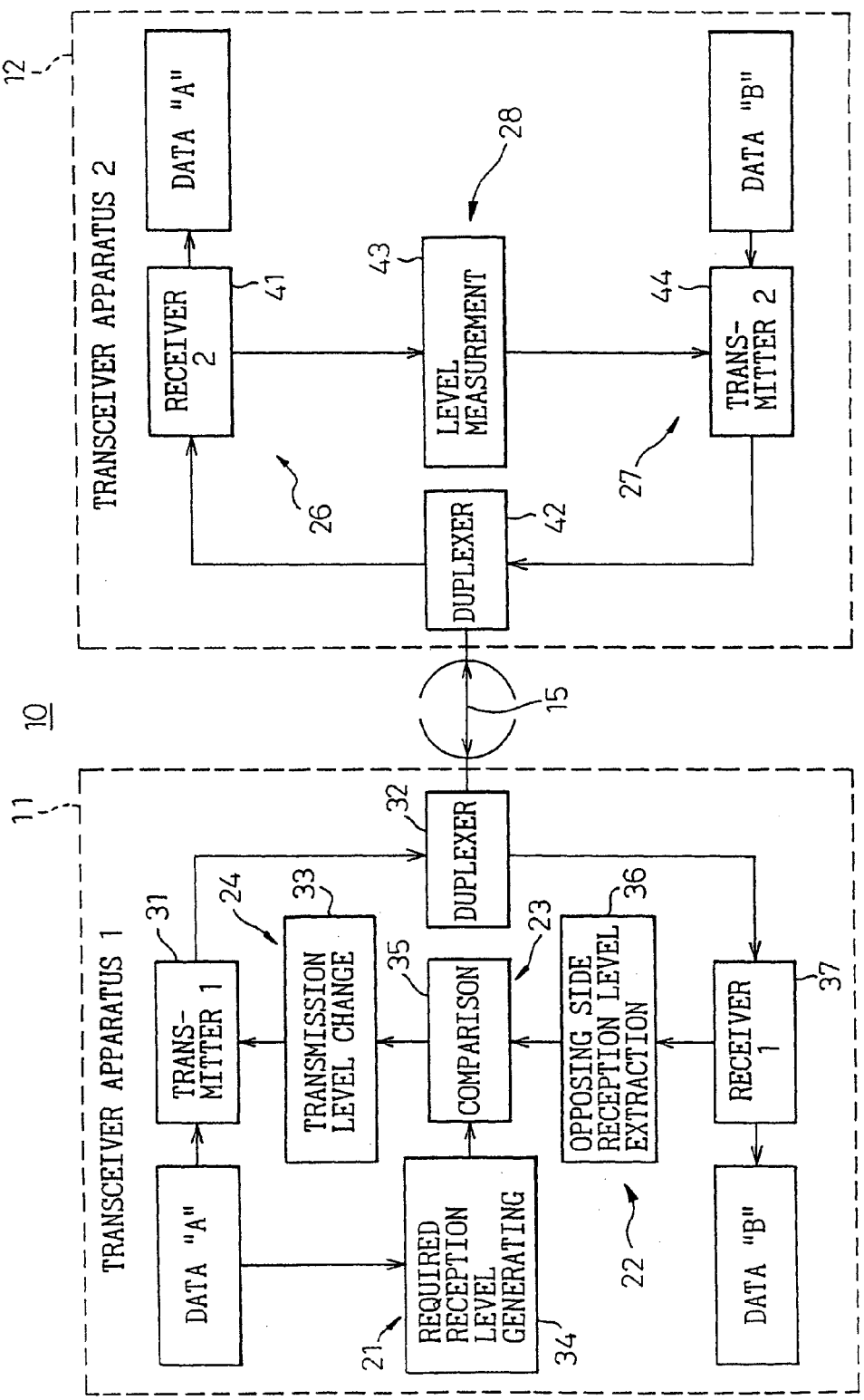
FIG. 3 is a block diagram of a first embodiment of first and second transceiver apparatuses according to the present invention.

FIG. 3 is a block diagram of a first embodiment of the first and second transceiver apparatuses according to the present invention. First, when looking at the transceiver apparatus 11 at the left side of the figure, this is a transceiver apparatus 11 in a wireless local loop system 10 for performing transferring data via a radio transmission path 15 and comprises a required reception level generation part 21, a reception level acquisition part 22, a comparison part 23, and a transmission level control part 24.

The required reception level generation part 21 discriminates the classification of the data, and generates the required reception level corresponding to this.

The reception level acquisition part 22 acquires the reception level of the data in the opposing side transceiver apparatus 12 via the radio transmission path 15.

The comparison part 23 compares the required reception level the acquired reception level and outputs the level difference of the two.

The transmission level control part 24 controls a change of the transmission level of the data to the opposing side transceiver apparatus 12 according to the level difference.

On the other hand, when viewing the transceiver apparatus 12 on the right side of FIG. 3, this is also a transceiver apparatus 12, in a wireless local loop system 10 for transferring data via a radio transmission path 15 and comprises a reception part 26, a transmission part 27, and a reception level detection part 28.

The reception part 26 receives the data transmitted from the opposing side transceiver apparatus 11.

The transmission part 27 transmits the data to the opposing side transceiver apparatus 11.

The reception level detection part 28 detects the reception level of the data received at the reception part 26.

Here, the transmission part 27 transmits the reception level information indicative of that detected reception level to the opposing side transceiver apparatus 11 via the radio transmission path 15.

Explaining this in a little more detail along with FIG. 3, at the transceiver apparatus 12 serving as the opposing side of the transceiver apparatus 11, at a receiver 41, a level measurement unit 43 measures the reception level and a transmitter 44 adds the reception level information to data B to be transmitted to the transceiver apparatus 11 and then transmits it via a duplexer 42. At the transceiver apparatus 11, based on the data classification of data A to be transmitted, a required reception level generation unit 34 generates the required reception level serving as the standard capable of securing the required BER. A comparison unit 35 compares this required reception level and the reception level information from the transceiver apparatus 12 obtained at an opposing side reception level extraction unit 36 via a duplexer 32 and a receiver 37. When the reception level is lower than the standard value, the transmission level is increased by exactly the insufficient amount, while conversely when it exceeds it, the transmission level change unit 33 performs control to maintain the transmission level as it is or decrease it by exactly the amount of excess.

Thus, in the first embodiment based on the present invention, the transmission level is controlled in accordance with the following steps:

First step: Reception level information indicative of the reception level of the data (data A) received at the opposing side transceiver apparatus 12 is received.

Second step: The reception level indicated in the received reception level information and the required reception level corresponding to the discriminated classification of the data (data A) to be transmitted to the opposing side transceiver apparatus 12 are compared.

Third step: The change of the transmission level of the data (data A) to be transmitted from the transceiver apparatus 11 is controlled according to the result of comparison.

Figure 4:
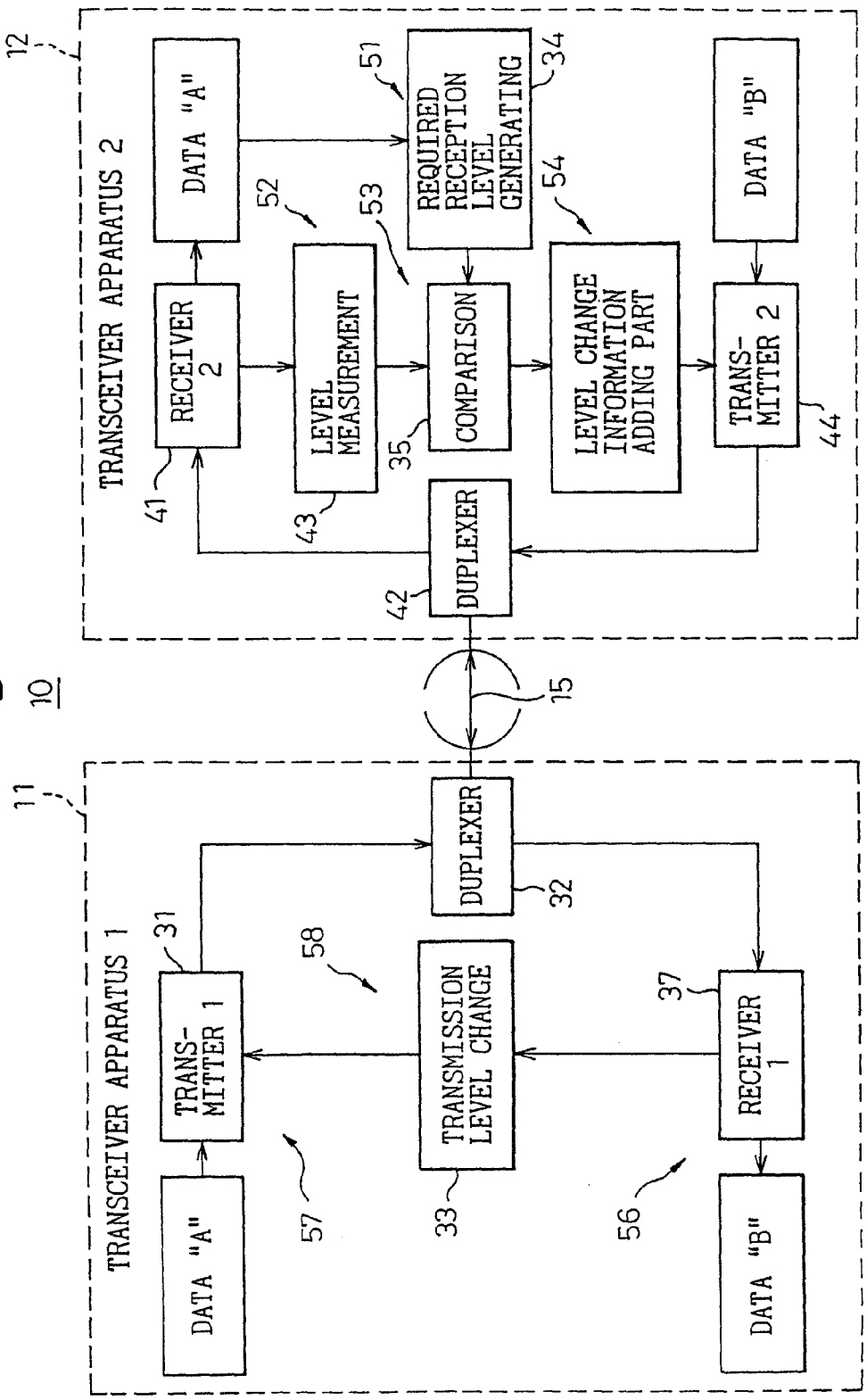
FIG. 4 is a block diagram of a second embodiment of first and second transceiver apparatuses according to the present invention.

FIG. 4 is a block diagram of a second embodiment of the first and second transceiver apparatuses according to the present invention. First, when viewing the transceiver apparatus 12 on the right side of the figure, this is a transceiver apparatus 12 in a wireless local loop system 10 for transferring data via a radio transmission path 15 and comprises a required reception level generating part 51, a reception level detection part 52, a comparison part 53, and a transmission level change information adding part 54.

The required reception level generating part 51 discriminates the classification of the data received from the opposing side transceiver apparatus 11 and generates a required reception level corresponding to this.

The reception level detection part 52 detects the reception level of the received data.

The comparison part 53 compares the required reception level and the detected reception level and outputs the level difference of the two.

The transmission level change information adding part 54 adds the transmission level change information according to the level difference to the data to be transmitted to the opposing side transceiver apparatus 11.

On the other hand, when viewing the transceiver apparatus 11 on the left side of FIG. 4, this is also a transceiver apparatus 11 in a wireless local loop system 10 for transferring data via a radio transmission path 15 and comprises a reception part 56, a transmission part 57, and a transmission level control part 58.

The reception part 56 receives the data transmitted from the opposing side transceiver apparatus 12 together with the transmission level change information added to this data.

The transmission part 57 transmits the data to the opposing side transceiver apparatus 12.

The transmission level control part 58 controls the change of the transmission level of the data to the opposing side transceiver apparatus 12 according to the transmission level change information extracted from the reception part 56.

Note that, in FIG. 4, components performing the same functions as those of the components shown in FIG. 3 are indicated by the same reference numerals. Explaining this in a little more detail along with FIG. 4, at the transceiver apparatus 12 serving as the opposing side of the transceiver apparatus 11, the comparison unit 35 compares the required reception level generated based on the data classification of the received data A and the reception level measured via the reception level measurement unit 43 from the receiver 41 and prepares transmission level change information based on the result of the comparison. For example, when the reception level is lower than the standard reception level, information indicative of the amount of increase of the transmission level based on the level difference is added to the data B to be transmitted to the transceiver apparatus 11. Conversely, when the reception level exceeds the standard reception level, information indicative of maintaining the transmission level as it is or the amount of decrease of the transmission level for decreasing the amount of excess is added to the data B and transmitted. In the transceiver apparatus 11, the transmission level is controlled at the transmitter 31 based on the transmission level change information. This control is performed by the transmission level change unit 33.

Thus, in the second embodiment according to the present invention, the transmission level is controlled in accordance with the following steps:

First step: The classification of the data (data A) received at the transceiver apparatus 12 is discriminated and the required reception level corresponding to this is generated.

Second step: The reception level of the data (data received at the transceiver apparatus 12 is detected.

Third step: The required reception level and the detected reception level are compared, and the level difference of the both is output.

Fourth step: The transmission level change information according to the level difference is added to the data (data B) to be transmitted from the transceiver apparatus 12.

Fifth step: The change of the transmission level of the data (data A) at the opposing side transceiver apparatus 11 is controlled according to the transmission level change information transmitted from the transceiver apparatus 12 added to the data (data B).

Next, an explanation will be made of some examples of the parts (21, 51) for generation of a required reception level mentioned above.

Figure 5:
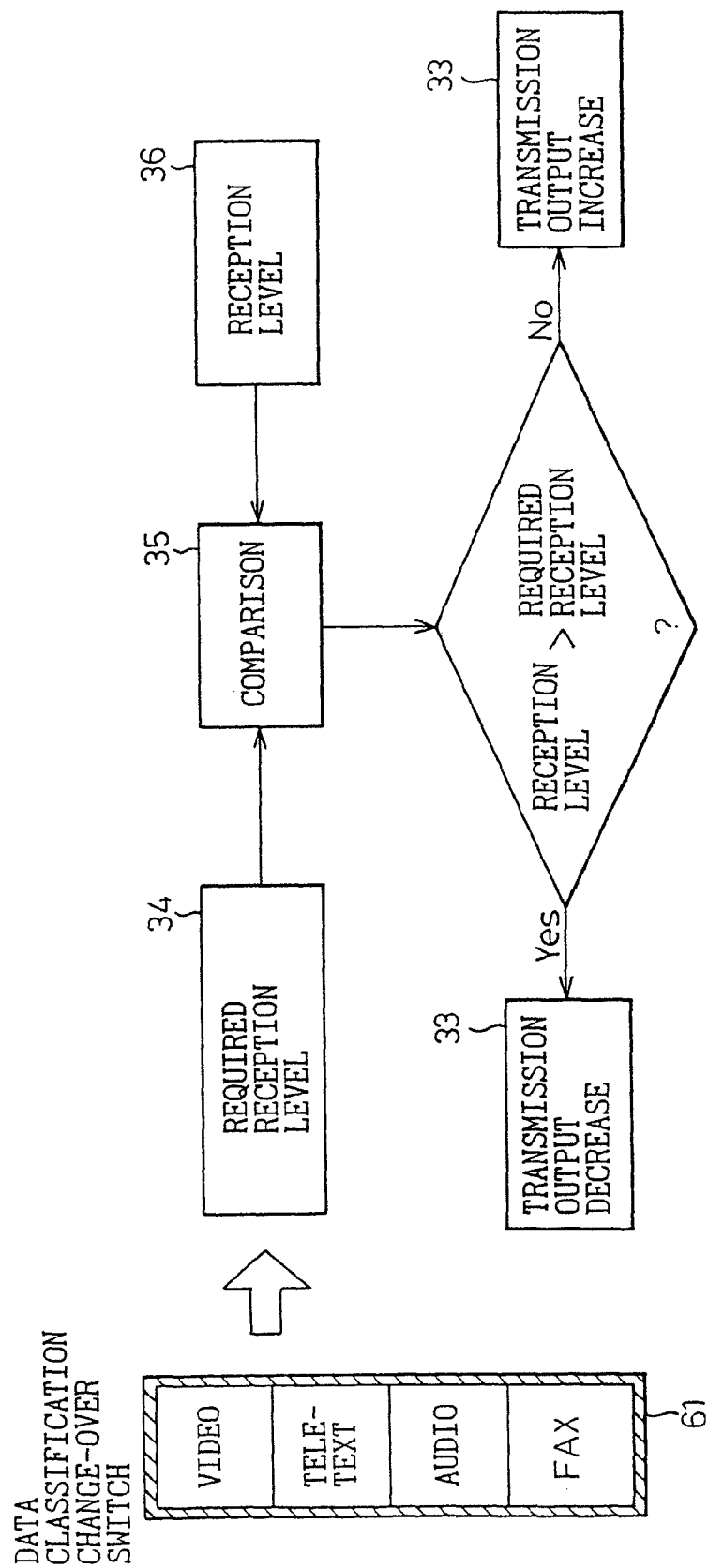
FIG. 5 is a view of a first example for generating a required reception level.

FIG. 5 is a view of a first example for generating a required reception level. Reference numeral 61 is a change-over switch attached to the transceiver apparatus (11 of FIG. 3 or 12 of FIG. 4). The classification of the data (data A) is set by the change-over switch 61 beforehand when the data to be transmitted is known in advance.

Due to this, the required BER for the data classification and the reception level required for this are also set (34).

By comparing this with the reception level measured at the opposing side transceiver apparatus 12 (FIG. 3) (35), it becomes possible to control the change of the transmission level (33). Note that reference numerals in parentheses show the corresponding circuit parts in FIG. 3.

FIG. 6 is a view of a second example for generating a required reception level. As shown in FIG. 6, the change-over switch 62 is attached to the transceiver apparatus (11 of FIG. 3). The required BER is freely set in advance by the switch, volume knob, or the like. Due to this, a required reception level enough to secure this required BER is generated (34). This and the reception level (36) measured at the opposing side are compared (35), whereby it becomes possible to control the change of the transmission level (33) and becomes possible to freely alter the channel quality.

FIG. 7 is a view of a third example for generating a required reception level.

When a personal computer or other terminal is connected to the transceiver apparatus 11 (FIG. 3) for communication, the data classification is switched beforehand by the switch, volume knob, or the like in the software at the terminal. Then, discrimination bits for allowing discrimination of the data classification are added to frames of the transmission data for transmission to the transceiver apparatus 12 (31).

The transceiver apparatus 12 reads the discrimination bits added to the frames of the received data, generates a required reception level enough to secure the required BER of the data A (34), and compares this and the measured reception level (43) (35), whereby it becomes possible to control the change of the transmission level (54).

Table 2 is a table for converting the BER represented by a 6-bit information ABCDEF

TABLE 2

| a | ABC | b | DEF |
|---|-----|---|-----|
| 1.0 | 000 | 9 | 111 |
| 2.0 | 001 | 8 | 110 |
| 3.0 | 010 | 7 | 101 |
| . | . | . | . |
| . | . | . | . |
| . | . | . | . |

FIG. 8 is a view of a fourth example for generating a required reception level.

When a personal computer or other terminal is connected to the transceiver apparatus 11 (FIG. 4), when transmitting data by that terminal, the required BER is switched by the change-over switch 64 in advance in the software of the related computer or the like, the required BER for the data classification is converted to 6-bit data (the first 3 bits of the header representing the multiplier of the BER and the latter 3 bits representing the absolute value of the exponent) according to Table 2, added to the header of the data frame to be transmitted, and transmitted to the transceiver apparatus 12.

In the transceiver apparatus 12, the information of the added required BER is read, and the required reception level capable of securing the BER is generated (34).

FIG. 9 is a view of a fifth example for generating required reception level.

Reference numeral 71 of the figure is an interface unit provided in the transceiver apparatus 11 (FIG. 3). The data classification is automatically discriminated at a data classification discrimination unit 72 according to which of the interfaces, different for each classification of the data to be transmitted (data A), is active (busy). Then, a required reception level enough to secure the required BER of the data classification is generated (34), this and the reception level at the opposing side receiver (36) are compared (35), and the transmission is controlled according to the result of the comparison (33).

FIG. 10 is a view a sixth example for generating a required reception level.

Reference numeral 71 of the figure is an interface unit provided in the transceiver apparatus 11 (FIG. 3) similar to FIG. 9. Required BERS corresponding to the interfaces, different for the classifications of the data to be transmitted (data A), are given by a BER setting unit 73. A reception level for realizing the required BER for the data classification of the input data (data A) is generated (34). This reception level and the reception level (36) at the opposing side transceiver apparatus 12 (FIG. 3) are compared (35), and the transmission is controlled according to the result of this comparison (33).

FIG. 11 is a view of a seventh example for generating a required reception level.

When connecting a personal computer or other terminal to the transceiver apparatus, a driver (for example, a discrimination bit adding unit 76 mentioned later) or the like is installed in that computer and extension codes of the transmission file are monitored by the software within the terminal at the time of file transfer. The contents of the transmission data are discriminated by the extension codes, for example, if the extension code is _____.wav, it is audio data, while if the extension code is _____.mpg, it is a moving picture. This is done by an extension code discriminating unit 75. The result of the discrimination is added to the header of the frame of the transmission data (data A) as the discrimination bits. This is done by a data classification discrimination bit adding unit 76. This is further transmitted to the transceiver apparatus.

In the transceiver apparatus, the added discrimination bits are read, a required reception level enough to secure the required BER of that data is generated (34), this required reception level and the reception level (36) at the opposing side transceiver apparatus are compared (35), and the transmission is controlled according to the result of the comparison (33).

FIG. 12 is a view of an eighth example for generating a required reception level.

When connecting a personal computer or other terminal to the transceiver apparatus, a driver (for example, a discrimination bit adding unit 77 mentioned later) or the like is installed in that computer and extension codes of the transmission file are monitored by the software within the terminal at the time of file transfer. The contents of the transmission data are discriminated by the extension codes as mentioned above, for example, if the extension code is _____.wav, it is audio data, while if the extension code is _____ .mpg, it is a moving picture. This is done by the extension code discriminating unit 75. Then, the required BER according to the data belonging to the extension code is converted to the 6-bit data according to table 2, added to the header of the frame of the transmission data as the BER information, and transmitted to the opposing side transceiver apparatus. This is done by a data classification discrimination bit adding unit 77.

In the transceiver apparatus, a required reception level capable of securing the required BER indicated by the added BER information is generated (34), the required reception level and the reception level at the opposing side transceiver apparatus (36) are compared (35), and the transmission is controlled according to the result of the comparison (33).

FIG. 13 is a view for explaining adjustment in the case of generating the required reception level. This is a procedure for individually adjusting the required BER according to the situation in the wireless local loop system.

In FIG. 13, when the classification of the data is discriminated, a predetermined BER (required BER) is allocated in accordance with the classification such as video, teletext broadcast, or other data. Here, the required BER can be individually adjusted. In the figure, an up/down switch 79 is shown as an example of the means for adjustment. When taking as an example video data, $3.0 \times 10^{-9}$ can be adjusted to for example $4.0 \times 10^{-9}$ (up) or $2.0 \times 10^{-9}$ (down). It is possible to perform this together for all required BER and also possible to perform this for only audio data. How is this adjusted may be suitably determined by the user according to the system status. Summarizing the effects of the invention, almost all of the methods of transmission level control of the related art monitored the opposing side reception level, BER, etc. to realize control of the required lowest limit of the transmission level. In this case, when the classification of the transmission data is fixed, the required C/N is also fixed, so there is no problem; but when it is intended to transmit a variety of data having different required C/Ns and BERs, the lines are designed to match with the strictest required C/N and the transmission level determined accordingly, so when transmitting data not having a strict required C/N, the transmission is carried out with an excessive output.

In order to solve this problem, the present invention enables the transmission level to be flexibly controlled on the same channel by referring to the opposing side reception level and further referring to the required C/N and reception level according to the classification of the transmission data without distinguishing the continuity or discontinuity of the data (packet, cell, etc.). By this, the power consumption can be lowered, and the interference to other channels can be reduced while making it possible to secure a sufficient channel quality.

While the invention has been described with reference to specific embodiments chosen for purposes of illustration, it should be apparent that numerous modifications could be made thereto by those skilled in the art without departing from the basic concept and scope of the invention.

What is claimed is:

1. A transceiver of a first radio station operable to perform communications with another transceiver of a second radio station, the transceiver of the first radio station comprising:
a receiver to receive a signal, including a plurality of bits indicating an identifier that identifies a classification of data of the received signal, from the transceiver of the second radio station;
a processor to determine, based on a power level of the signal received from the transceiver of the second radio station and a power control value corresponding to the identifier, predetermined according to the classification of data, either an amount of transmission level to be increased or an amount of transmission level to be decreased, by which the another transceiver of the second radio station needs to control transmission power of signals to be transmitted to the transceiver of the first radio station; and
a transmitter operable to transmit information indicative of an amount to be increased or information indicative of an amount to be decreased determined by the processor to the another transceiver of the second radio station to cause the another transceiver to change the power by the increase amount or the decrease amount.

\* \* \* \* \*